(12) United States Patent
Wu et al.

(10) Patent No.: US 10,515,252 B2
(45) Date of Patent: Dec. 24, 2019

(54) OPTICAL ELEMENT FABRICATION METHOD AND OPTICAL SENSING DEVICE

(71) Applicants: Chih-Yen Wu, Hsinchu County (TW); Chen-Ta Ho, Hsinchu (TW); Chien-Hung Wu, Taipei (TW)

(72) Inventors: Chih-Yen Wu, Hsinchu County (TW); Chen-Ta Ho, Hsinchu (TW); Chien-Hung Wu, Taipei (TW)

( * ) Notice: Subject to any disclaimer, the term of this patent is extended or adjusted under 35 U.S.C. 154(b) by 155 days.

(21) Appl. No.: 15/818,779

(22) Filed: Nov. 21, 2017

(65) Prior Publication Data

US 2018/0336389 A1 Nov. 22, 2018

Related U.S. Application Data

(60) Provisional application No. 62/508,339, filed on May 18, 2017.

(51) Int. Cl.
| | |
|---|---|
| *G06K 9/00* | (2006.01) |
| *G02B 3/00* | (2006.01) |
| *B32B 37/14* | (2006.01) |
| *G01J 1/02* | (2006.01) |
| *G01J 1/04* | (2006.01) |
| *G02B 13/00* | (2006.01) |
| *G01J 1/44* | (2006.01) |

(52) U.S. Cl.
CPC ............ *G06K 9/0004* (2013.01); *B32B 37/14* (2013.01); *G01J 1/0204* (2013.01); *G01J 1/0411* (2013.01); *G01J 1/44* (2013.01); *G02B 3/0012* (2013.01); *G02B 3/0056* (2013.01); *G02B 13/0085* (2013.01); *B32B 2307/40* (2013.01)

(58) Field of Classification Search
CPC ........ G06K 9/0004; G01J 1/44; G01J 1/0411; G01J 1/0204; G02B 13/0085; G02B 3/0056; G02B 3/0012; G02B 3/0031; B32B 37/14; B32B 2307/40; B32B 2038/045; B32B 37/02
USPC ...................................... 250/208.1
See application file for complete search history.

(56) References Cited

U.S. PATENT DOCUMENTS

| | | | |
|---|---|---|---|
| 6,001,540 A | 12/1999 | Huang | |
| 6,171,883 B1 | 1/2001 | Fan | |
| 6,445,514 B1 | 9/2002 | Ohnstein | |
| 6,821,810 B1 | 11/2004 | Hsiao | |
| 7,808,542 B2 * | 10/2010 | Furukawa | ......... H01L 27/14627 348/340 |
| 7,972,889 B2 | 7/2011 | Kong | |
| 8,492,695 B2 * | 7/2013 | Horikoshi | ......... H01L 27/14625 250/208.1 |
| 2002/0105699 A1 | 8/2002 | Miracky | |

(Continued)

FOREIGN PATENT DOCUMENTS

TW          201250870 A1    12/2012

*Primary Examiner* — Seung C Sohn

(57) ABSTRACT

An optical element fabrication method including following steps are provided. First, a micro-lens layer including a micro-lens and a first substrate is provided. Besides, a micro optical channel layer including a micro optical channel and a second substrate is provided. A first bonding process is performed to bond the micro-lens layer to the micro optical channel layer, wherein the micro-lens is corresponded to the micro optical channel in a direction that is perpendicular to the surface of the second substrate, and the first substrate of the micro-lens layer is removed later.

20 Claims, 14 Drawing Sheets

(56) References Cited

U.S. PATENT DOCUMENTS

| | | |
|---|---|---|
| 2005/0074702 A1 | 4/2005 | Lee |
| 2009/0212381 A1 | 8/2009 | Crisp |
| 2012/0225514 A1 | 9/2012 | Wada |
| 2016/0224816 A1 | 8/2016 | Smith |
| 2016/0254312 A1 | 9/2016 | Lee |
| 2017/0017824 A1 | 1/2017 | Smith |

* cited by examiner

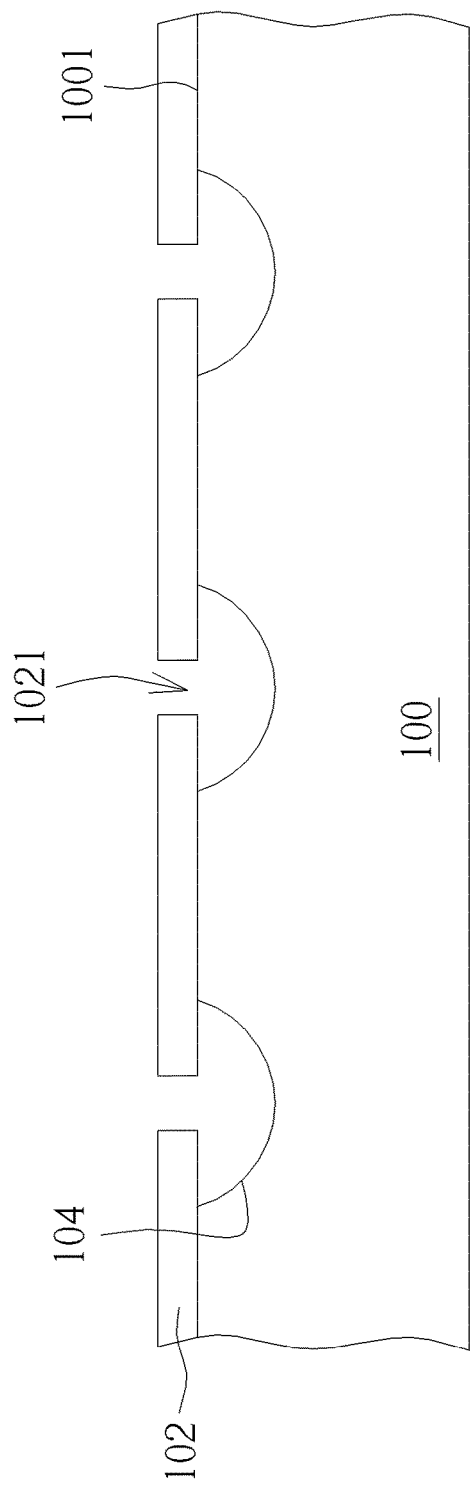
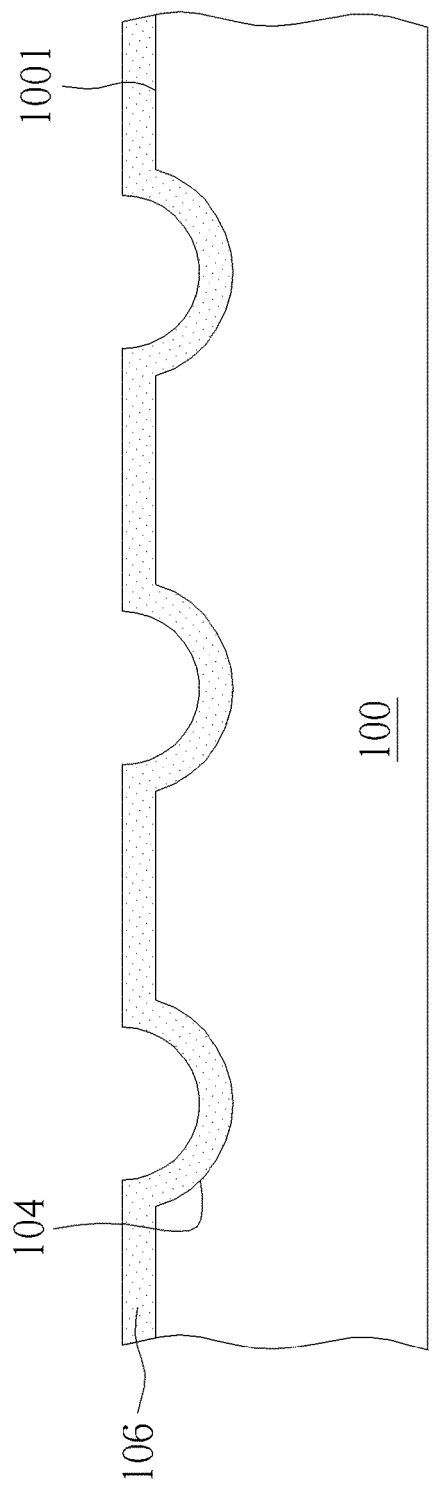

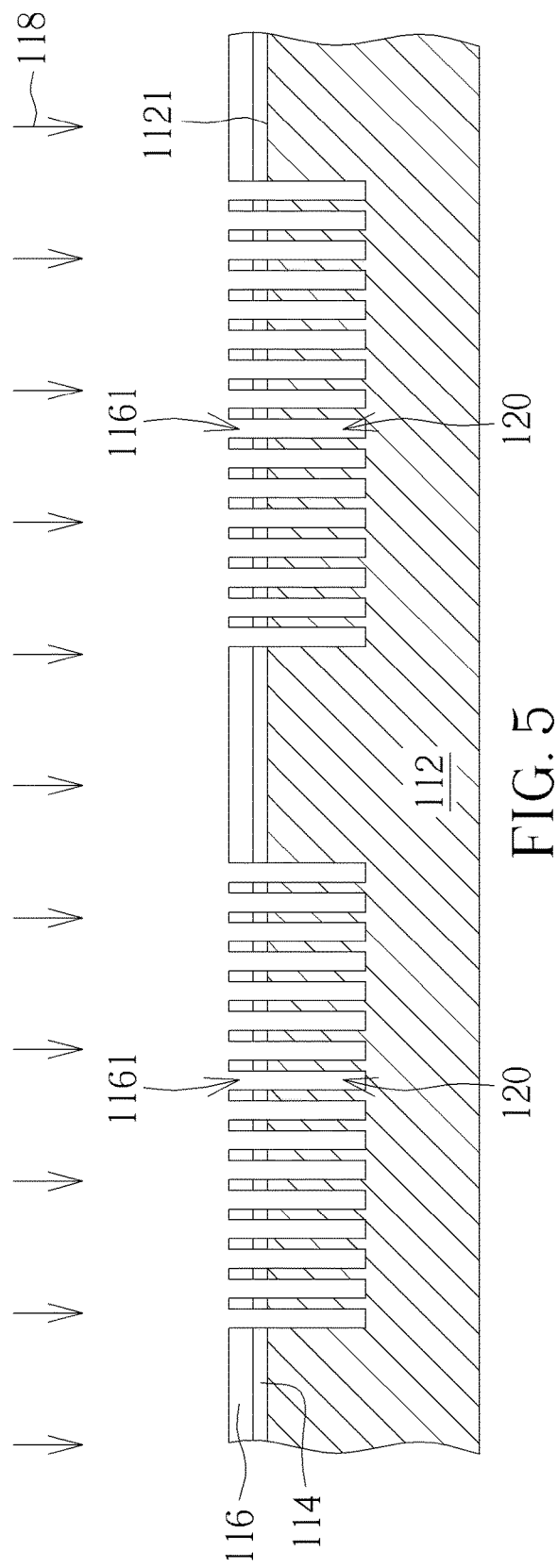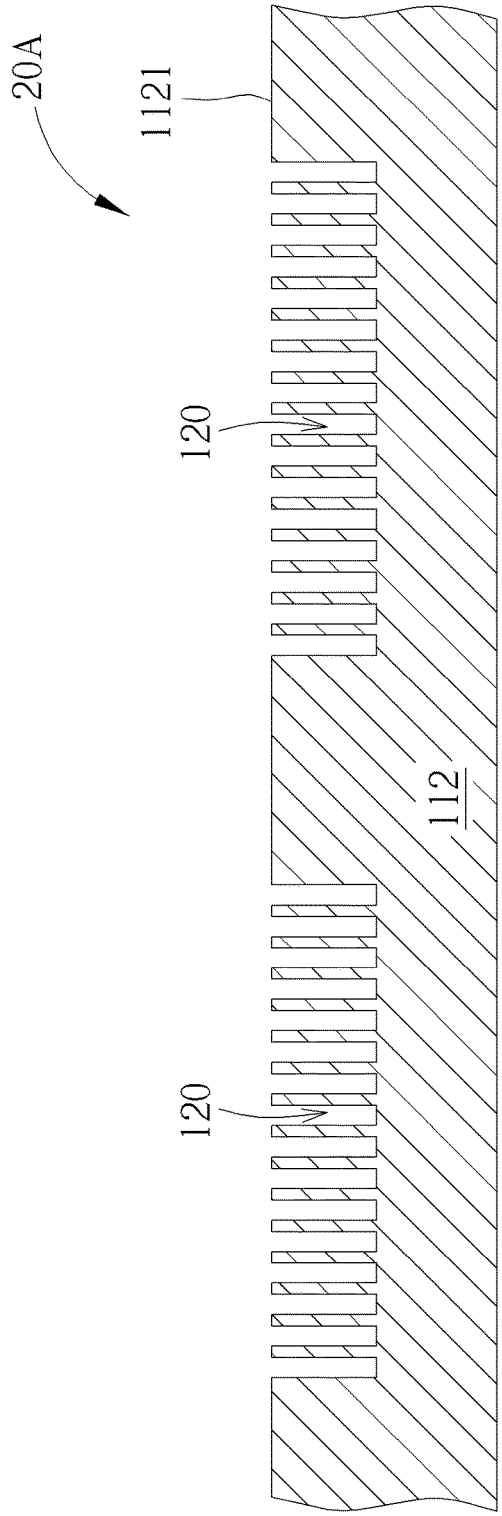

OPTICAL ELEMENT FABRICATION METHOD AND OPTICAL SENSING DEVICE

CROSS REFERENCE TO RELATED APPLICATIONS

This application claims the benefit of U.S. Provisional Patent Application No. 62/508,339, filed on May 18, 2017, the contents of which are hereby incorporated by reference in their entirety.

BACKGROUND OF THE INVENTION

1. Field of the Invention

The present invention relates to an optical element fabrication method and an optical sensing device, more particularly, to a micro optical element fabrication method and an optical sensing device used for optical fingerprint identification.

2. Description of the Prior Art

At present, due to the rise of smartphones, coupled with personal privacy and security needs, fingerprint identification function attached to the phone or used for access control has become the current mainstream trend. Either active or passive capacitive fingerprint sensor chips are utilized in smartphones for either phone unlock or function (or app) initiation. For the most part, the installation of the fingerprint sensor chip is at the backside of the smartphone. If the installation is conducted at the front viewing side (screen glass side), it is required to either form an open hole or add extra thinning procedures to the screen glass in the area of the sensor chip installed underneath. Those extra manufacturing steps can cause an increase in the overall cost. On the other hand, since the integrity of the appearance of the phone is emphasized, the screen glass without an open hole for fingerprint identification function gradually becomes a requirement.

In addition, though ultrasonic technology can also be applied to fingerprint identification and may not have the limit in glass thickness, the current chip cost is already too high and there is not enough economic benefit in production and massive adaption of ultrasonic technology in smartphones at this moment. In another aspect, the optical fingerprint identification technology may have an opportunity to become mainstream for the next generation of fingerprint identification. The optical sensing device has high signal (light) penetration through the screen glass and provides the possibility of performing identification without opening a hole or adding extra thinning steps to the screen glass, and the identification of biological characteristics such as fingerprints for security strengthening can be achieved. The optical fingerprint sensing device may gradually become mainstream for the next generation of fingerprint identification system in mobile devices. Presently, there are several imaging systems for the optical fingerprint identification: reflective, film reflection, pinhole imaging, optical fiber imaging or a large fingerprint identification system composed of multiple groups of lenses. However, the sizes of sensors or corresponding elements in the conventional optical fingerprint sensing device are not small enough to fit into the mobile devices, and therefore the industry expects to develop smaller and more accurate fingerprint identification devices.

SUMMARY OF THE INVENTION

The present invention provides an optical element fabrication method and an optical sensing device used for optical fingerprint identification.

According to an embodiment of the present invention, an optical element fabrication method including following steps is provided. First, a micro-lens layer is formed, wherein the micro-lens layer includes a micro-lens and a first substrate, and the micro-lens is disposed on a surface of the first substrate. In addition, a micro optical channel layer is formed, wherein the micro optical channel layer includes a micro optical channel and a second substrate, and the micro optical channel is disposed at a first surface of the second substrate. Next, a bonding process is performed to bond the micro-lens layer to the micro optical channel layer by making the surface of the first substrate face the first surface of the second substrate, so that the micro-lens corresponds to the micro optical channel in a vertical projection direction perpendicular to the first surface of the second substrate. Later, the first substrate of the micro-lens layer is removed.

According to an embodiment of the present invention, an optical sensing device is provided. The optical sensing device includes a light sensor, a micro optical channel layer, and a micro-lens. A width of the light sensor ranges from about 10 micrometers to about 100 micrometers. The micro optical channel layer includes a micro optical channel and a substrate, wherein the micro optical channel penetrates the substrate in a vertical projection direction perpendicular to a surface of the substrate. The micro optical channel is disposed between the micro-lens and the light sensor, and the micro-lens, the micro optical channel and the light sensor correspond to each other in the vertical projection direction. The micro optical channel is disposed between the micro-lens and the light sensor, and the micro-lens, the micro optical channel and the light sensor correspond to each other in the vertical projection direction.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-3 are schematic diagrams illustrating a fabrication method of a micro-lens layer of a first embodiment of the present invention.

FIGS. 4-6 are schematic diagrams illustrating a fabrication method of a micro optical channel layer of the first embodiment of the present invention.

DETAILED DESCRIPTION

To provide a better understanding of the present invention, preferred embodiments will be detailed as follows. The preferred embodiments of the present invention are illustrated in the accompanying drawings to elaborate the contents and effects to be achieved. It is noted that, for purposes of illustrative clarity and being easily understood by the readers, the various features illustrated in various drawings may not be drawn to scale, and the dimension or scale of each device shown in drawings are only illustrative and are not intended to limit the scope of the present invention.

It should be noted that the technical features in the following different embodiments can be combined, replaced, or mixed with one another to constitute another embodiment without departing from the spirit of the invention.

The present invention provides an optical element fabrication method that includes processes of forming a micro-lens layer and a micro optical channel layer respectively, bonding the micro-lens layer and the micro optical channel layer, and further bonding them to a sensor. The methods of forming the micro-lens layer and the micro optical channel layer and forming the optical element afterward are detailed hereinafter.

Figure 3:
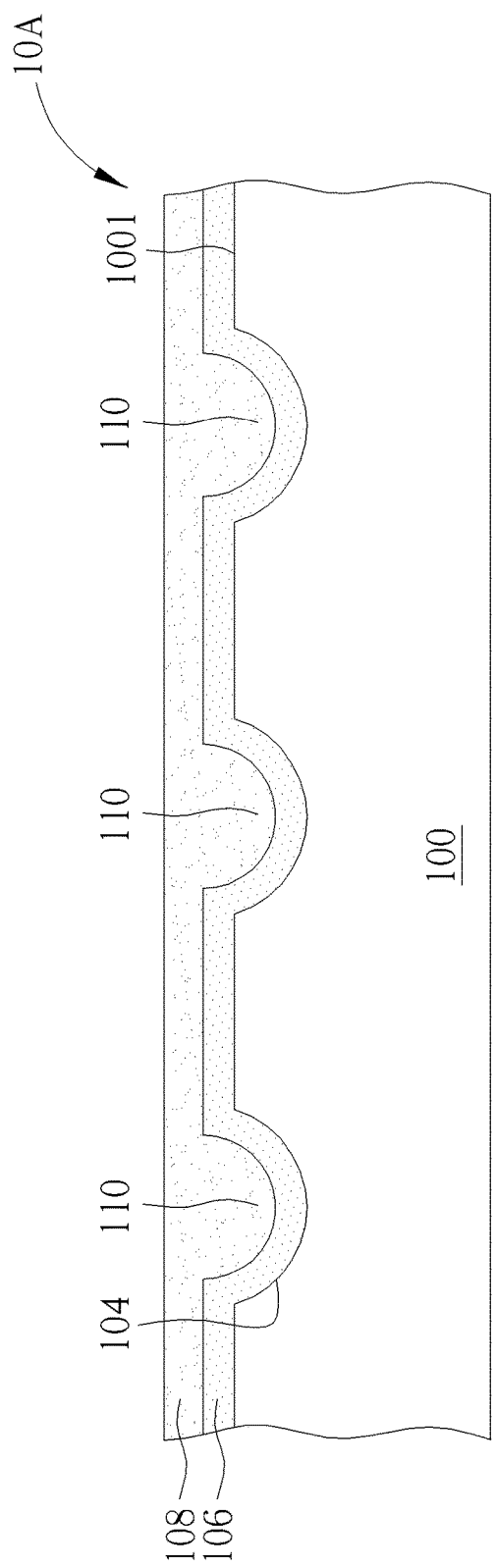

Referring to FIG. 1 to FIG. 3, FIGS. 1-3 are schematic diagrams illustrating a fabrication method of a micro-lens layer of a first embodiment of the present invention. As shown in FIG. 1, a first substrate 100 is provided first, the first substrate 100 may include a rigid substrate. For example, the first substrate 100 of this embodiment is a glass substrate, but not limited thereto. Later, a patterned mask layer 102 is formed on a surface 1001 of the first substrate 100, and the patterned mask layer 102 may be a patterned hard mask layer for instance. For example, the material of the patterned mask layer 102 in this embodiment may include amorphous silicon, and the patterned mask layer 102 may be formed by performing the photolithography and etching process to an amorphous silicon layer, but not limited thereto. Next, a plurality of recesses 104 are formed at the surface 1001 of the first substrate 100, and the manufacturing method may be performing an etching process to the first substrate 100 for example. In this embodiment, the patterned mask layer 102 includes a plurality of openings 1021 respectively exposing portions of the surface 1001 of the first substrate 100, and the portion of the first substrate 100 corresponding to each opening 1021 is removed by the etching process. Further, the etching process may be an isotropic etching process for example, but not limited thereto. Accordingly, the recess 104 may be a hemisphere recess for example. Later, the patterned mask layer 102 is removed from the surface 1001 of the first substrate 100. Next, as shown in FIG. 2, a first layer 106 is formed on the recesses 104 and the surface 1001 of the first substrate 100 conformally. The first layer 106 may include a thin film layer. For example, the material of the first layer 106 can include amorphous silicon, and the first layer 106 may be formed by the deposition process, but not limited thereto. Next, as shown in FIG. 3, a second layer 108 is formed on the first layer 106, wherein the second layer 108 fills the recesses 104 to form a plurality of micro-lenses 110 in the recesses 104. In this embodiment, the second layer 108 can include a low refractive index material, and the refractive index of the low refractive index material ranges from 1 to 1.5. The second layer 108 may be a spin on glass (SOG) for example, and the manufacturing method can include fully coating the SOG on the first layer 106 and curing the SOG, but not limited thereto. In short, the micro-lenses 110 of this embodiment are formed of the low refractive index material. Comparing to the conventional micro-lenses that are usually formed of polymer materials, the material of the micro-lenses 110 of this embodiment is SOG having better heat resistance and therefore can endure the heat produced during the fabrication method of this embodiment. In addition, the micro-lens 110 of this embodiment may be a hemisphere lens for example. Additionally, a planarization process may be selectively performed to the surface of the second layer 108 that is distant from the first layer 106, and the flat surface is beneficial for bonding the micro-lenses 110 to other substrates later. Accordingly, a micro-lens layer 10A in this embodiment can include the first substrate 100, the first layer 106, and the second layer 108, wherein the micro-lenses 110 formed of the second layer 108 are disposed on the surface 1001 of the first substrate 100. Additionally, the number of the micro-lenses 110 is not limited to FIG. 3. According to the above fabrication method, the micro-lenses 110 formed in this embodiment can be disposed in an array on the surface 1001 of the first substrate 100.

Figure 4:
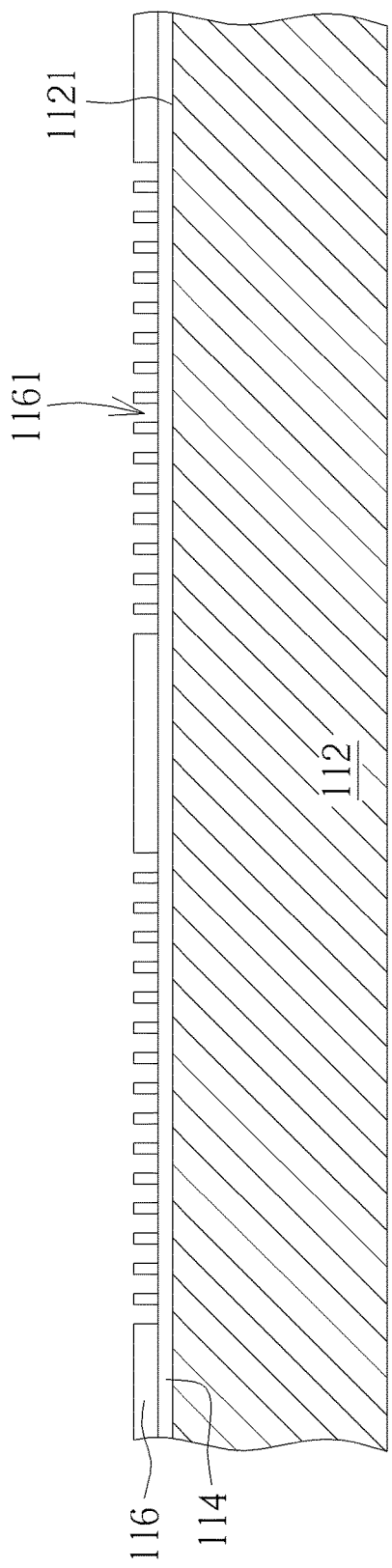

Referring to FIG. 4 to FIG. 6, FIGS. 4-6 are schematic diagrams illustrating a fabrication method of a micro optical channel layer of the first embodiment of the present invention. As shown in FIG. 4, a second substrate 112 is provided first, and a dielectric layer 114 is formed on a first surface 1121 of the second substrate 112. For example, the second substrate 112 of this embodiment may include a rigid substrate (e.g., silicon substrate or silicon wafer), and the dielectric layer 114 may include an oxide layer (e.g., plasma enhanced oxide layer), but not limited thereto. Next, a patterned mask layer 116 is formed on the dielectric layer 114, and the patterned mask layer 116 may be a patterned hard mask layer for instance. For example, the patterned mask layer 116 of this embodiment may be formed by a photolithography process and a reactive ion etch (RIE) process, but not limited thereto. In this embodiment, the patterned mask layer 116 includes a plurality of openings 1161 that respectively expose portions of the surface of the dielectric layer 114. Next, as shown in FIG. 5, the patterned mask layer 116 is used as an etching mask, so as to form a plurality of micro optical channels 120 in the second substrate 112 by performing a deep etching process 118 to the first surface 1121 of the second substrate 112. Specifically, the portions of the dielectric layer 114 and the portions of the second substrate 112 corresponding to the openings 1161 are removed by the deep etching process 118 through the openings 1161, such that the micro optical channels 120 are formed at a side of the second substrate 112 that is close to the first surface 1121. Further, the deep etching process 118 of this embodiment can include the deep reactive ion etch (DRIE) process, but not limited thereto. In this embodiment, an aspect ratio of the micro optical channels 120 formed by the deep etching process 118 ranges from 0.5 to 50, but not limited thereto. Later, as shown in FIG. 6, the patterned mask layer 116 is removed from the first surface 1121 of the second substrate 112, and the dielectric layer 114 can be removed together. Accordingly, a micro optical channel layer 20A in this embodiment can include the micro optical channels 120 and the second substrate 112, and the micro optical channels 120 are disposed at the first surface 1121 of the second substrate 112. According to the above fabrication method, the micro optical channels 120 formed in this embodiment can be disposed in an array at the first surface 1121 of the second substrate 112.

Figure 7:
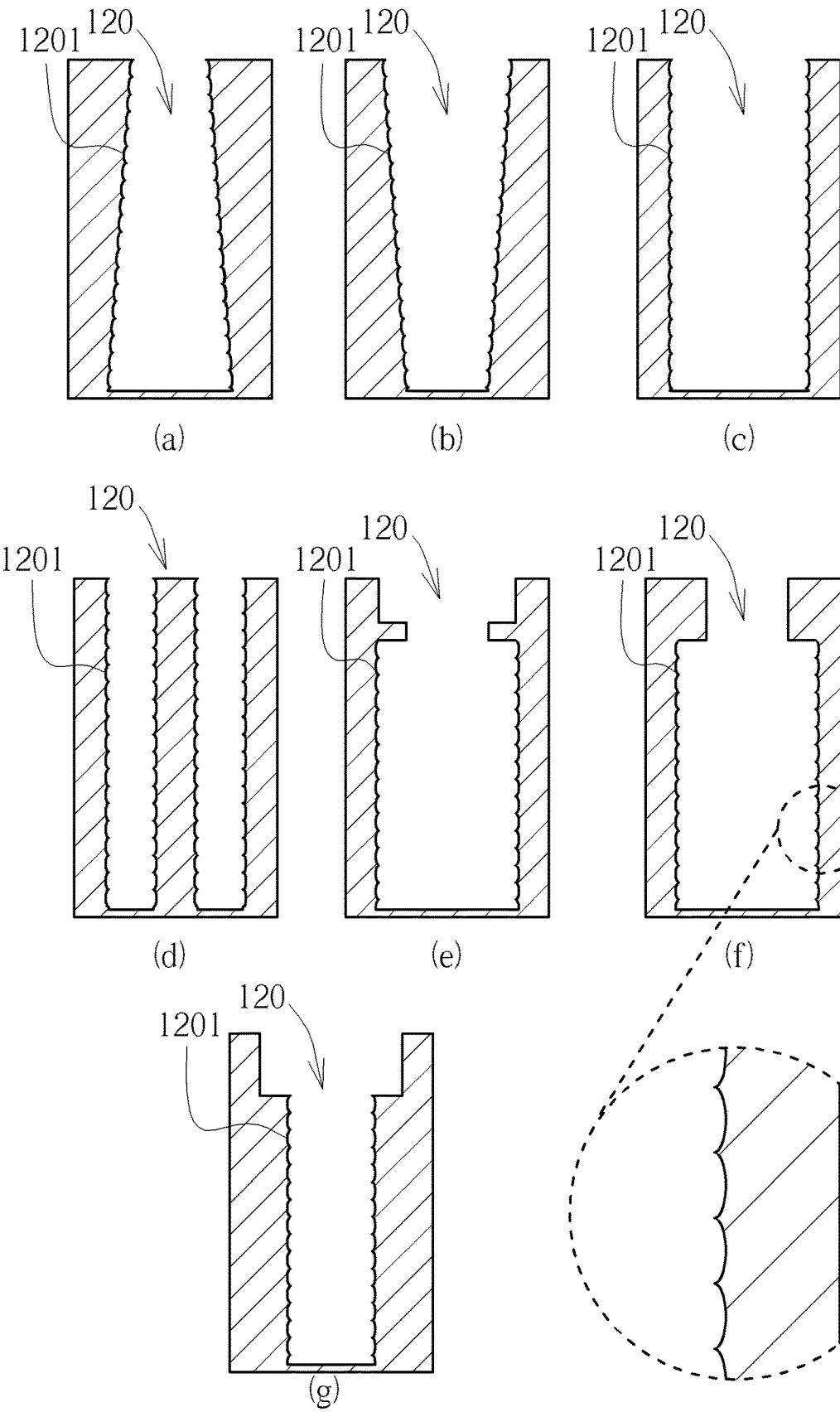
FIG. 7 is a schematic diagram illustrating cross-sectional views of various micro optical channels of the first embodiment of the present invention.

Referring to FIG. 7, FIG. 7 is a schematic diagram illustrating cross-sectional views of various micro optical channels of the first embodiment of the present invention. In this embodiment, a cross-sectional profile of the micro optical channel 120 is not limited to FIG. 6. As shown in FIG. 7, the cross-sectional profile of the micro optical channel 120 can include (a) tapered shape, (b) funnel shape, (c) column shape, (d) multi-column shape, (e) column shape with auxiliary collimating structure, or (f) and (g) column shape with multi-inner diameter. In another aspect, a side wall 1201 of the micro optical channel 120 can include a ring pattern, and the cross-sectional profile of the ring pattern may include the scallop shape (may also referred to as the arc shape, undulating shape or the like) such as the enlarged diagram of (f) shown in FIG. 7, but not limited thereto. For example, in some embodiments, the micro optical channel 120 may include a flat side wall or a straight side wall. Various cross-sectional profiles of the micro optical channel 120 and the ring pattern of the side wall 1201 mentioned above can be formed by the deep etching process 118 in this embodiment. The parameters of the deep etching process 118 can be adjusted according to different requirements indifferent situations. Additionally, the deep etching process 118 can include one or multiple etching steps.

Figure 8:
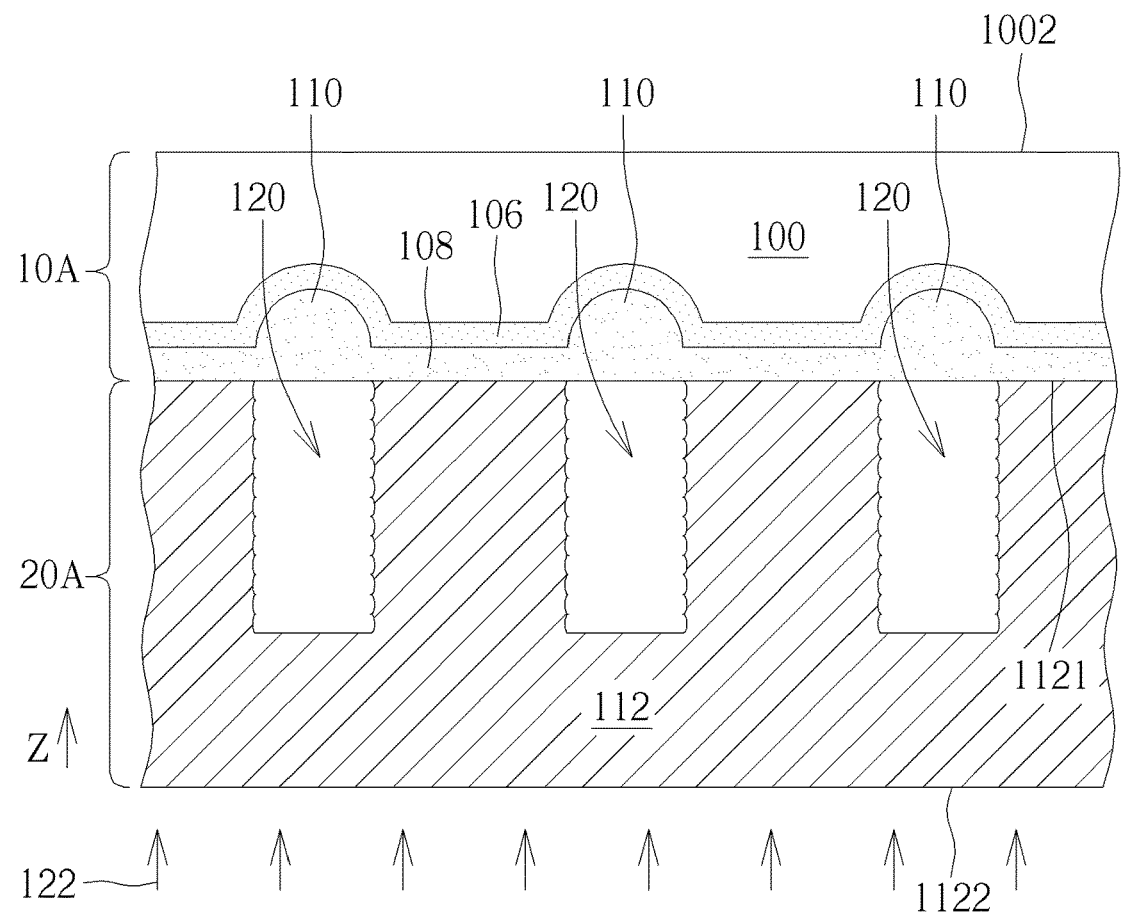
FIGS. 8-10 are schematic diagrams illustrating a first bonding process of the first embodiment of the present invention.
Figure 9:
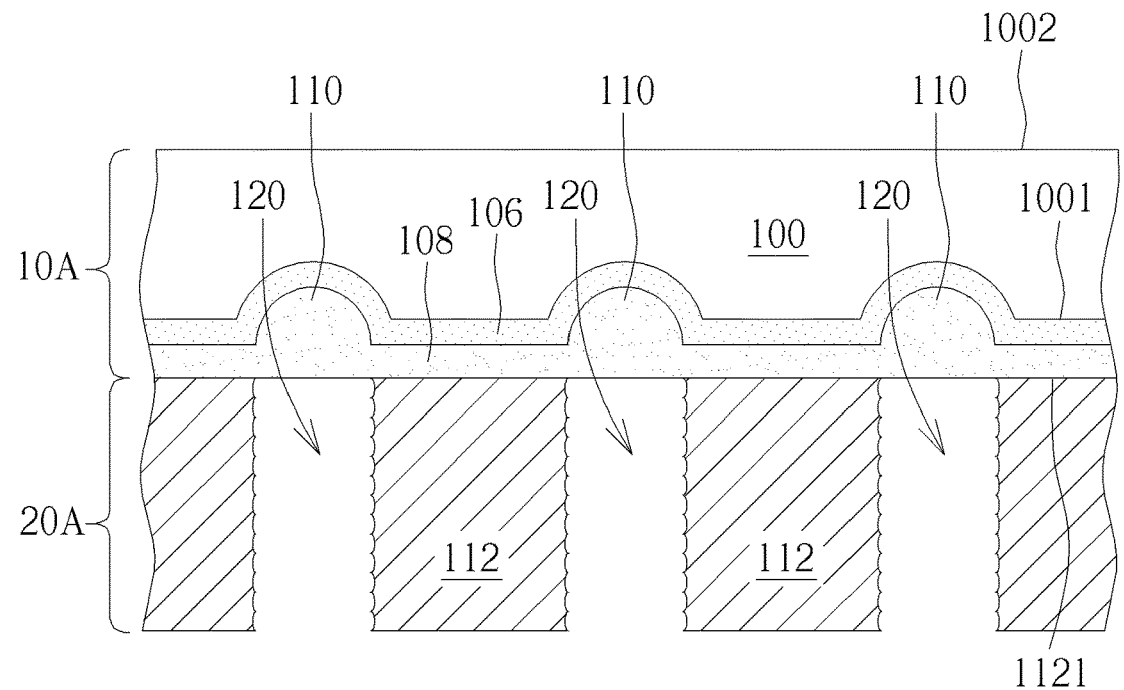
Figure 10:
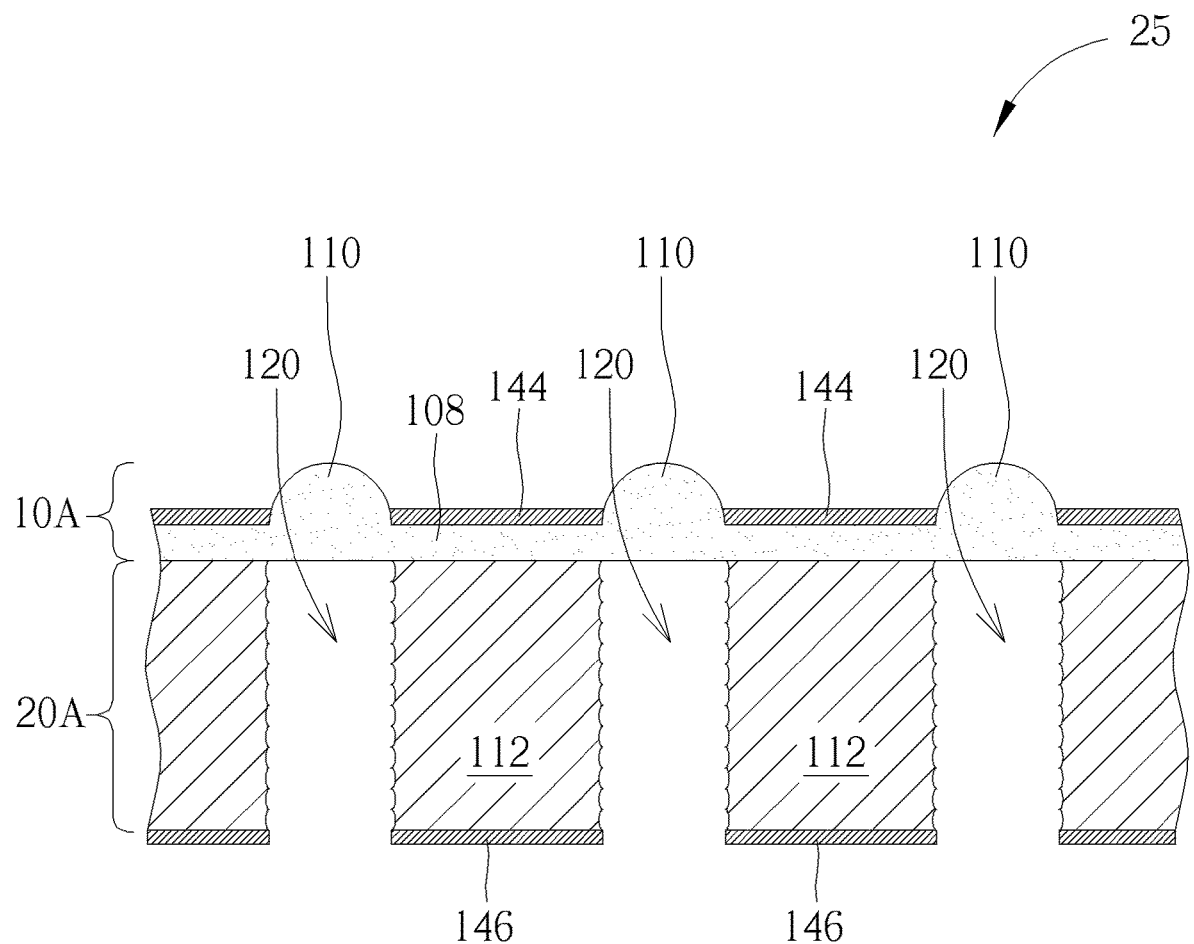

Referring to FIG. 8 to FIG. 10, FIGS. 8-10 are schematic diagrams illustrating a first bonding process of the first embodiment of the present invention. For clarity, only three micro-lenses 110 and three micro optical channels 120 are illustrated in FIGS. 8-10 for example, but the numbers of the micro-lenses 110 and the micro optical channels 120 are not limited thereto. As shown in FIG. 8, a first bonding process is performed to bond the micro-lens layer 10A to the micro optical channel layer 20A by making the surface 1001 of the first substrate 100 face the first surface 1121 of the second substrate 112, so that each of the micro-lenses 110 corresponds to one of the micro optical channels 120 in a vertical projection direction Z perpendicular to the first surface 1121 of the second substrate 112. In this embodiment, each of the micro-lenses 110 and the corresponding micro optical channel 120 are aligned and bonded. Specifically, each of the micro-lenses 110 is directly connected to the corresponding micro optical channel 120 after the first bonding process, and the micro-lenses 110 and the micro optical channels 120 are disposed between the first substrate 100 and the second substrate 112. Next, a thinning process 122 is performed to a second surface 1122 of the second substrate 112 opposite to the first surface 1121, so as to expose the micro optical channel 120 and make the micro optical channel 120 penetrate the second substrate 112, as shown in FIG. 9. The thinning process 122 of this embodiment may include the grinding process, but not limited thereto. Next, the first substrate 100 and the first layer 106 of the micro-lens layer 10A are removed. In this embodiment, an etching process is performed to a surface 1002 of the first substrate 100 opposite to the surface 1001, so as to remove the first substrate 100 (e.g., glass substrate) and expose the first layer 106. Next, another etching process is performed to the first layer 106 to remove the first layer 106 (e.g., amorphous silicon layer) and expose the micro-lenses 110, as shown in FIG. 10. It is noteworthy that the aforementioned thinning process 122 performed to the second surface 1122 of the second substrate 112 is not limited to be performed before removing the first substrate 100 and the first layer 106. In other embodiments, the first substrate 100 and the first layer 106 may be removed first, and the thinning process 122 may be performed later. Next, as shown in FIG. 10, a patterned optical coating 144 is formed on a surface of the second substrate 112, and another patterned optical coating 146 is formed on another surface of the second substrate 112, wherein these surfaces are opposite surfaces of the second substrate 112 in the vertical projection direction Z, and the patterned optical coatings 144, 146 are perpendicular to the vertical projection direction Z. Accordingly, an optical element 25 of this embodiment is formed, wherein the upper patterned optical coating 144 exposes the micro-lenses 110, and the lower patterned optical coating 146 exposes the micro optical channels 120. The material of the patterned optical coating 144 of this embodiment may include metallic material or polymeric material. For example, the metal layer may be formed by chemical vapor deposition or sputtering deposition, the polymer layer may be formed by spin coating, but not limited thereto. For example, a patterned photoresist layer can be formed corresponding to the micro-lenses 110 and disposed thereon first. Next, after the metal layer or the polymer layer is formed, the patterned photoresist layer and the metallic material or the polymeric material disposed thereon are removed together to expose the micro-lenses 110. In addition, since the size of the opening (e.g., diameter of the opening) of the micro optical channel 120 is small and the aspect ratio of the micro optical channel 120 is high, the metal layer or the polymer layer is difficult to form inside the micro optical channel 120. It is noteworthy that the method of forming patterned optical coatings 144, 146 are not limited to the description above and may include other patterning methods known in this field. Additionally, it is not limited to form the patterned optical coatings 144, 146 on two surfaces at two sides of the second substrate 112 as this embodiment. In other embodiments, the patterned optical coating may be formed on only one surface at one side of the second substrate 112.

Figure 11:
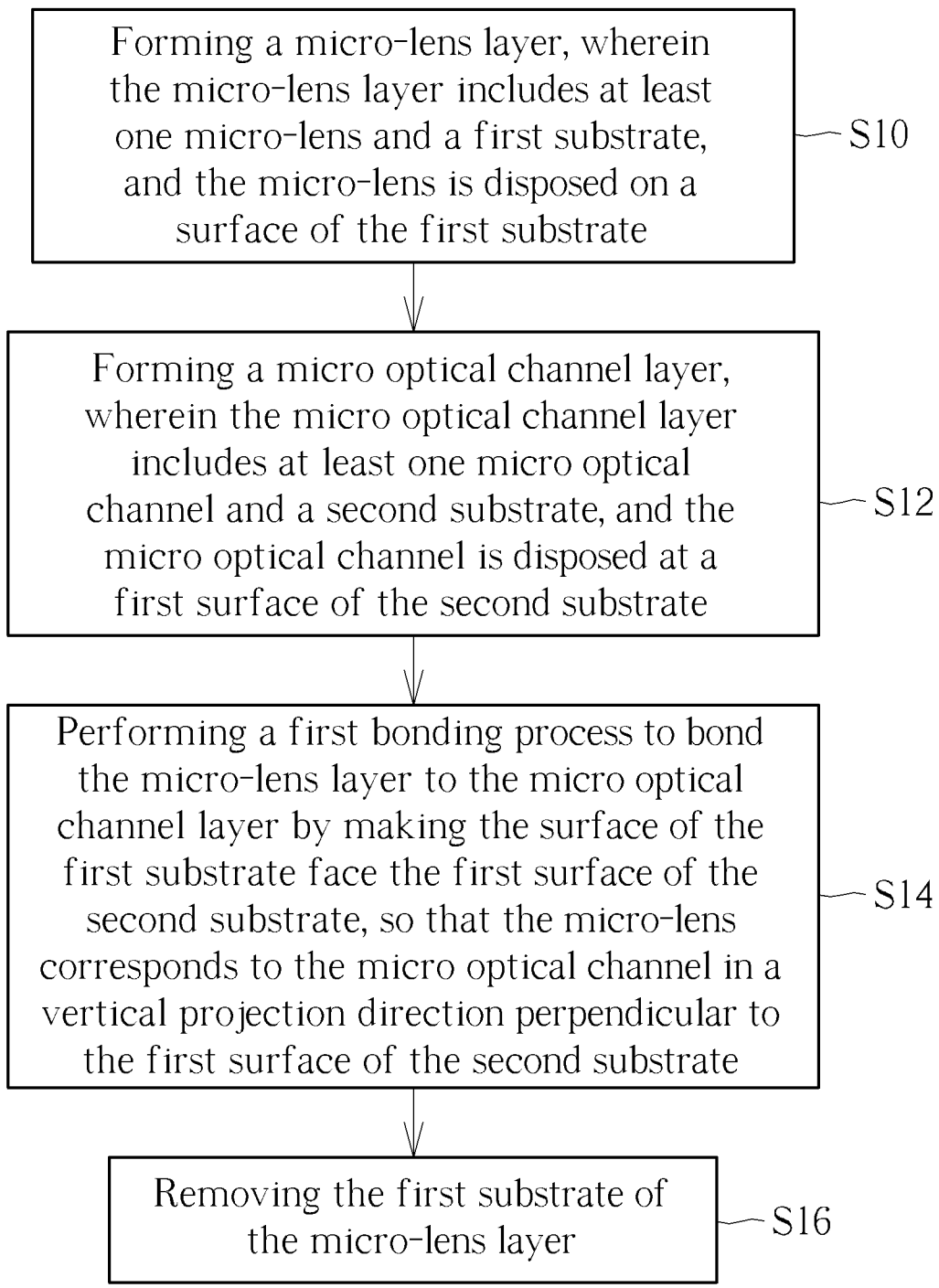
FIG. 11 is a schematic diagram illustrating a process flow of an optical element fabrication method of the first embodiment of the present invention.

In short, the optical element fabrication method of the present invention mainly includes the steps shown in FIG. 11:

step S10: Forming a micro-lens layer, wherein the micro-lens layer includes at least one micro-lens and a first substrate, and the micro-lens is disposed on a surface of the first substrate;

step S12: Forming a micro optical channel layer, wherein the micro optical channel layer includes at least one micro optical channel and a second substrate, and the micro optical channel is disposed at a first surface of the second substrate;

step S14: Performing a first bonding process to bond the micro-lens layer to the micro optical channel layer by making the surface of the first substrate face the first surface of the second substrate, so that the micro-lens corresponds to the micro optical channel in a vertical projection direction perpendicular to the first surface of the second substrate; and step S16: Removing the first substrate of the micro-lens layer.

Figure 12:
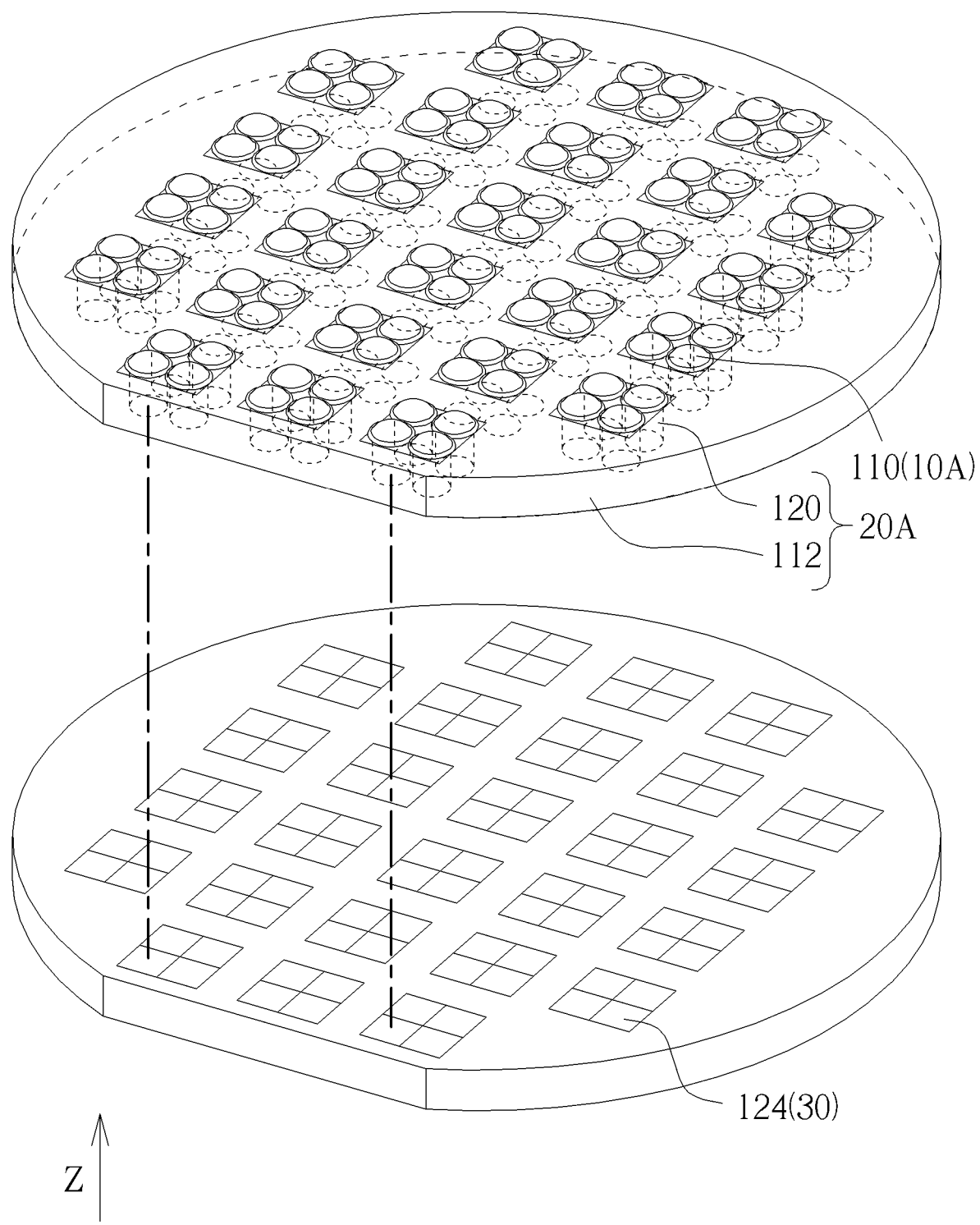
FIG. 12 is a schematic diagram illustrating a second bonding process of the first embodiment of the present invention.
Figure 13:
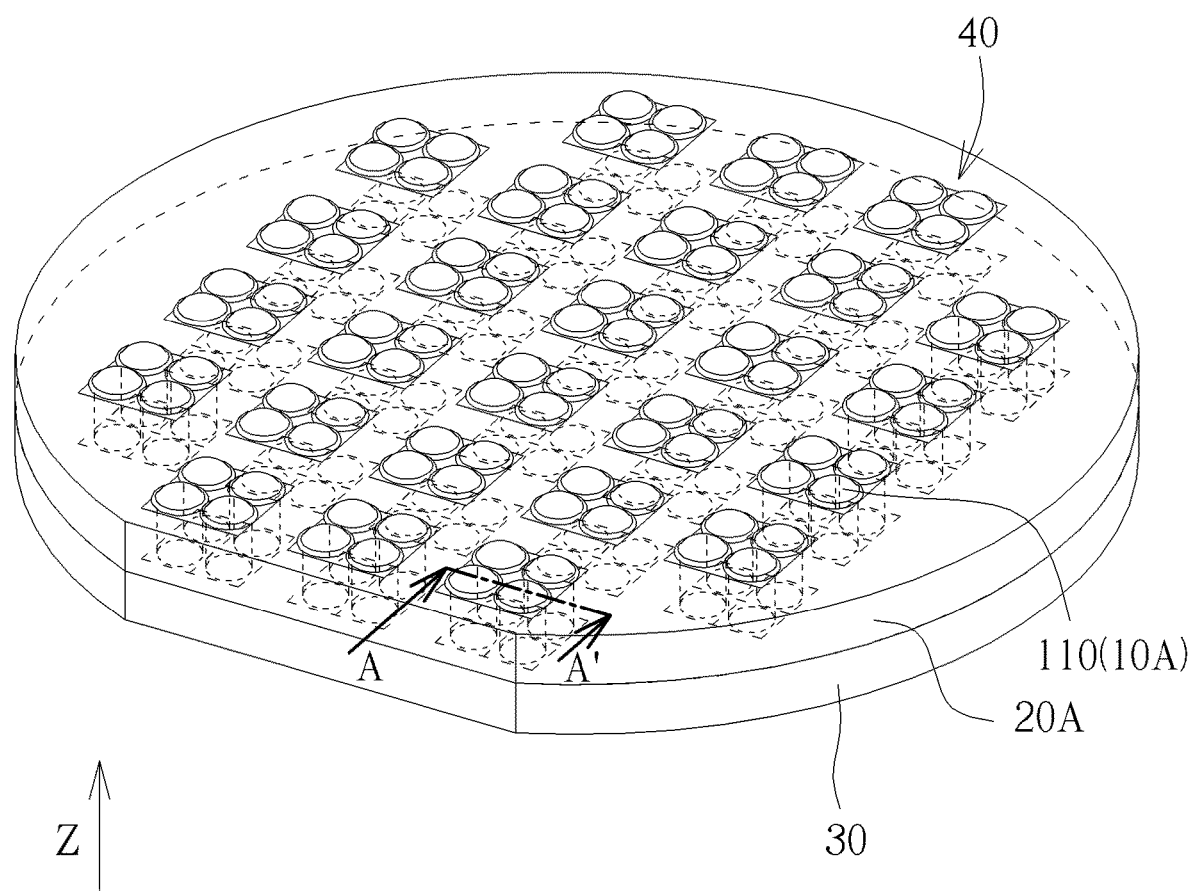
FIG. 13 is a schematic diagram illustrating a structure of bonded micro-lens layer, micro optical channel layer, and light sensor array of the first embodiment of the present invention.
Figure 14:
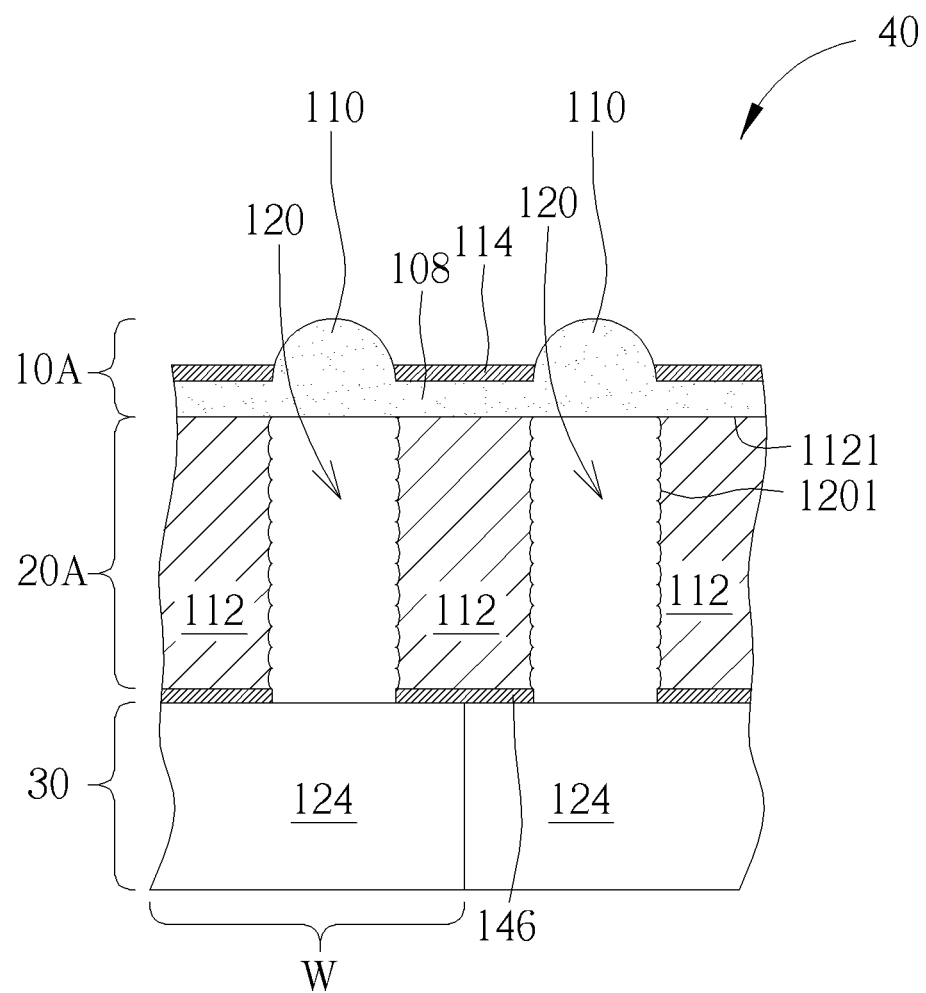
FIG. 14 is a cross-sectional diagram taken along a line A-A' in FIG. 13.

Referring to FIG. 12 to FIG. 14, FIG. 12 is a schematic diagram illustrating a second bonding process of the first embodiment of the present invention, FIG. 13 is a schematic diagram illustrating a structure of bonded micro-lens layer, micro optical channel layer, and light sensor array of the first embodiment of the present invention, and FIG. 14 is a cross-sectional diagram taken along a line A-A' in FIG. 13. For clarity and highlighting the important features, only a portion of the micro optical channels 120 in an optical sensing device 40 are shown in FIG. 12 and FIG. 13 while the patterned optical coatings 144, 146 are omitted. As shown in FIG. 12, a light sensor array 30 is provided, and the light sensor array 30 includes a plurality of light sensors 124. The light sensors 124 in this embodiment are disposed in an array, and the light sensor 124 includes the device that is capable of converting the light into the electric signal. Next, a second bonding process is performed, the micro-lens layer 10A and the micro optical channel layer 20A bonded by the first bonding process (such as the optical element 25 in FIG. 10) is further bonded to the light sensor array 30. Accordingly, the micro optical channel 120 is disposed between the micro-lens 110 and the light sensor 124, and the light sensor 124 corresponds to the micro optical channel 120 in the vertical projection direction Z. For example, in the second bonding process, each of the light sensors 124 is configured to align one of the micro optical channels 120 or one of the micro-lenses 110 in the vertical projection direction Z. Therefore, after the second bonding process, each of the micro optical channels 120 is disposed between the corresponding micro-lens 110 and the corresponding light sensor 124 in the vertical projection direction Z (as shown in FIG. 14). Next, after the second bonding process (as shown in FIG. 13), the bonded micro-lens layer 10A, micro optical channel layer 20A, and light sensor array 30 are further cut into a plurality of optical sensing devices 40 (as shown in FIG. 14) along cutting lines. In addition, the numbers of the micro-lenses 110, the micro optical channels 120, and the light sensors 124 in the optical sensing device 40 can be adjusted according to different requirements and are not limited to FIG. 13 and FIG. 14. Further, in the optical sensing device 40, each of the light sensors 124 may also correspond to multiple micro optical channels 120 or multiple micro-lenses 110.

In this embodiment, the first bonding process and the second bonding process can respectively include adhesive bonding, polymer bonding (BenzoCycloButene, BCB), metal eutectic bonding, silicon on glass (Spin on Glass, SOG) fused bonding, surface activated low-temperature wafer bonding, anodic boding, or soldering, but not limited thereto. In addition, the method of fabricating the optical element 25 (or the optical sensing device 40) in this embodiment adopts the semiconductor manufacturing process or the microelectromechanical systems (MEMS) technology, wherein the micro-lenses 110 and the micro optical channels 120 can be formed by the photolithography and etching process, and the micro-lenses 110 and the micro optical channels 120 can be produced by batch. Therefore, the aforementioned micro-lens layer 10A can be a wafer level micro-lens array, and the micro optical channel layer 20A can be a wafer level light-path micro-channel array. In another aspect, the resolution of the optical sensing device should be at least 500 dots per inch (dpi) in order to identify fingerprints. If the optical sensing device is applied to the mobile device and disposed under the cover glass without forming a hole, the size (e.g., length or width) of each micro-lens should be less than 50 micrometers. Such structure of the optical sensing device is too small to be formed by molding or machining nowadays. However, the fabrication method of this embodiment is capable of forming the micro-lenses having a size smaller than 50 micrometers. In another aspect, since the optical element of this embodiment can be formed by the semiconductor manufacturing process, the alignment mark can be formed on each substrate, so that different substrates can be aligned in every bonding process. Additionally, the bonding process of this embodiment proceeds in a way of wafer to wafer bonding for example, but not limited thereto. In other embodiments, the bonding process may also proceed in a way of chip to chip bonding or chip to wafer bonding.

Referring to FIG. 14, the structure of the optical sensing device 40 of this embodiment includes the light sensors 124, the micro optical channel layer 20A, and the micro-lenses 110, wherein a width W of the light sensor 124 ranges from about 10 micrometers to about 100 micrometers. In other embodiments, the width of the light sensor may range from about 20 micrometers to about 100 micrometers. The micro optical channel layer 20A includes the micro optical channels 120 and the second substrate 112, the micro optical channels 120 penetrate the second substrate 112 in the vertical projection direction Z perpendicular to the surface 1121 of the second substrate 112, wherein the micro optical channels 120 are disposed between the micro-lenses 110 and the light sensors 124, and each of the micro optical channels 120 corresponds to one of the micro-lenses 110 and one of the light sensors 124 in the vertical projection direction Z. In this embodiment, the micro optical channel 120 is configured to align the corresponding micro-lens 110 and the corresponding light sensor 124 in the vertical projection direction Z, and the micro optical channel 120, the micro-lens 110 and the light sensor 124 are connected directly. Additionally, as described above, the material of the micro-lens 110 can include the low refractive index material. The aspect ratio of the micro optical channel 120 ranges from 0.5 to 50. The side wall 1201 of the micro optical channel 120 can selectively include a ring pattern, and the cross-sectional profile of the ring pattern includes the scallop shape. The cross-sectional profile of the micro optical channel 120 can include column shape, funnel shape, tapered shape, multi-column shape, column shape with auxiliary collimating structure or column shape with multi-inner diameter, as shown in FIG. 7. In FIG. 14, although the width of the micro-lens 110 and the width of the micro optical channel 120 are approximately the same, but the present invention is not limited thereto. In other embodiments, the width of the micro-lens 110 can be greater or less than the width of the micro optical channel 120.

Figure 15:
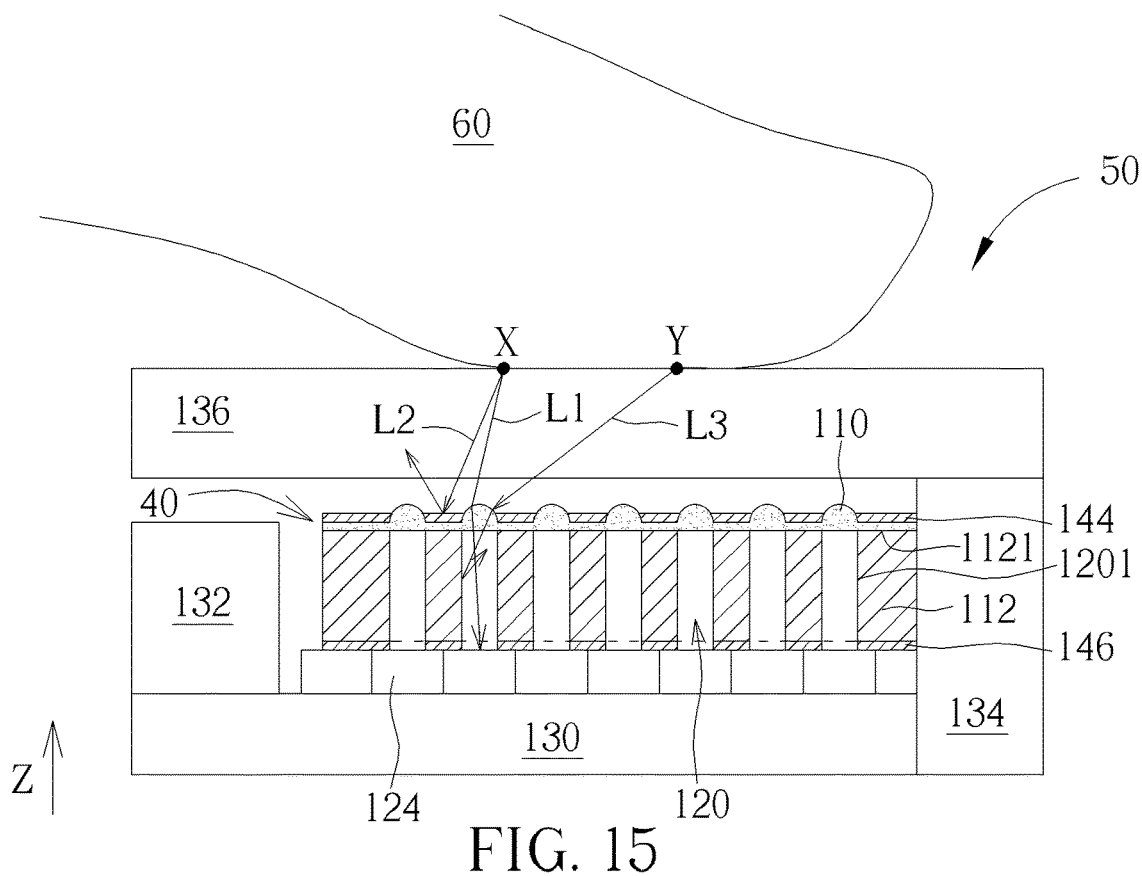
FIG. 15 is a schematic diagram illustrating a cross-sectional view of an optical sensing module of the first embodiment of the present invention.

Referring to FIG. 15, FIG. 15 is a schematic diagram illustrating a cross-sectional view of an optical sensing module of the first embodiment of the present invention. As shown in FIG. 15, an optical sensing module 50 is further provided in this embodiment, the optical sensing module 50 includes a substrate 130, a light source 132, a frame 134, a cover layer 136, and the aforementioned optical sensing device 40. The optical sensing device 40 and the light source 132 are disposed on the substrate 130. The substrate 130 may include the rigid substrate or the printed circuit board (PCB) for example. The light source 132 is disposed at one side of the optical sensing device 40, and the light source 132 may include the light emitting diode such as the resonant cavity light emitting diode (RCLED). The light produced by the light source 132 can include the near infrared light, but not limited thereto. The wavelength of the near infrared light may be about 580 nanometers to about 1040 nanometers for example, and may be about 940 nanometers preferably. The frame 134 can be disposed at at least one side of the optical sensing device 40 and can surround the optical sensing device 40 for example. The cover layer 136 is disposed on the optical sensing device 40 and close to the micro-lenses 110, such that the optical sensing device 40 is disposed between the cover layer 136 and the substrate 130. The cover layer 136 of this embodiment covers the light source 132, the optical sensing device 40, and the frame 134 to protect these devices. The cover layer 136 may include the cover glass, but not limited thereto.

When an object (such as a finger) 60 contacts the cover layer 136, the light emitted from the light source 132 penetrates the cover layer 136 to the surface of the object 60, and the light is reflected by the object 60 to the optical sensing device 40 below. For example, the light L1 is reflected by the object 60 at a location X on the surface of the object 60, although the direction of the light L1 is not directly toward the corresponding light sensor 124 below, but since the deviation angle is small, the light L1 can still reach the corresponding light sensor 124 after refraction by the micro-lens 110. In another aspect, the deviation angle of another light L2 reflected at the location X is greater than that of the light L1. The light L2 is reflected again to the cover layer 136 by the patterned optical coating 144 adjoining to the micro-lens 110 corresponding to the location X. Accordingly, the light L2 is prevented from being absorbed by the adjoining light sensor 124 since the light L2 is the near infrared light and is penetrative. Therefore, the crosstalk effect can also be reduced. In another aspect, when the light L3 is reflected at another location Y at a large angle and further enters the micro-lens 110 corresponding to the location X, the light L3 is refracted in the micro-lens 110 with a large angle. Later, the light L3 contacts the side wall 1201 of the micro optical channel 120 with an angle greater than a specific incident angle, and the light L3 is reflected again to the cover layer 136 by the ring pattern on the side wall 1201. Accordingly, the light sensor 124 is prevented from absorbing the light reflected by the location of the object 60 that does not correspond to the light sensor 124 and making misjudgments. The specific incident angle mentioned above may relate to the shape of the ring pattern. In addition, the aforementioned principle of light transmitting confining is not limited to be applied to the light reflected by the surface of the object 60, it can also be applied to the light in the environment. For example, the patterned optical coatings 144, 146 disposed at two sides of the second substrate 112 can reduce the interference of the light in the environment surrounding the light sensor 124.

In short, according to the design of the micro-lens 110 and the micro optical channel 120 in this embodiment, since the micro-lens 110 can concentrate the light, the percentage of the light contacting the specific location (such as the location X) on the object 60 and being collimated by the micro-lens 110 and penetrating the corresponding micro optical channel 120 is improved. Therefore, each specific region of the object 60 can be respectively imaged by the optical sensing module 50, and the fingerprint imaging can be achieved. The design of the ring pattern reduces the light unrelated to the specific region making the signal interference to the light sensor 124. Additionally, the patterned optical coatings 144, 146 prevent the light sensor 124 from being interfered by diffraction or scattering of the reflective light or the ambient light.

The optical element and the related fabrication method of the present invention are not limited to the aforementioned embodiment. The following description continues to detail other embodiments. To simplify the description and show the difference between other embodiments and the above-mentioned embodiment, identical components in each of the following embodiments are marked with identical symbols, and the identical features will not be redundantly described.

Figure 16:
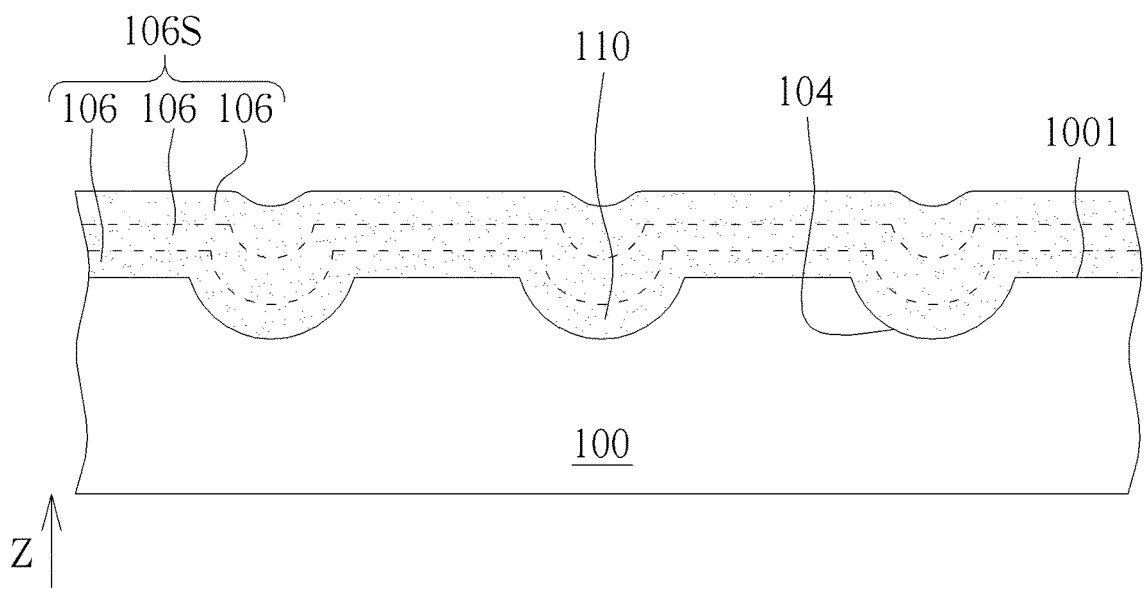
FIGS. 16-17 are schematic diagrams illustrating a fabrication method of a micro-lens layer of a second embodiment of the present invention.
Figure 17:
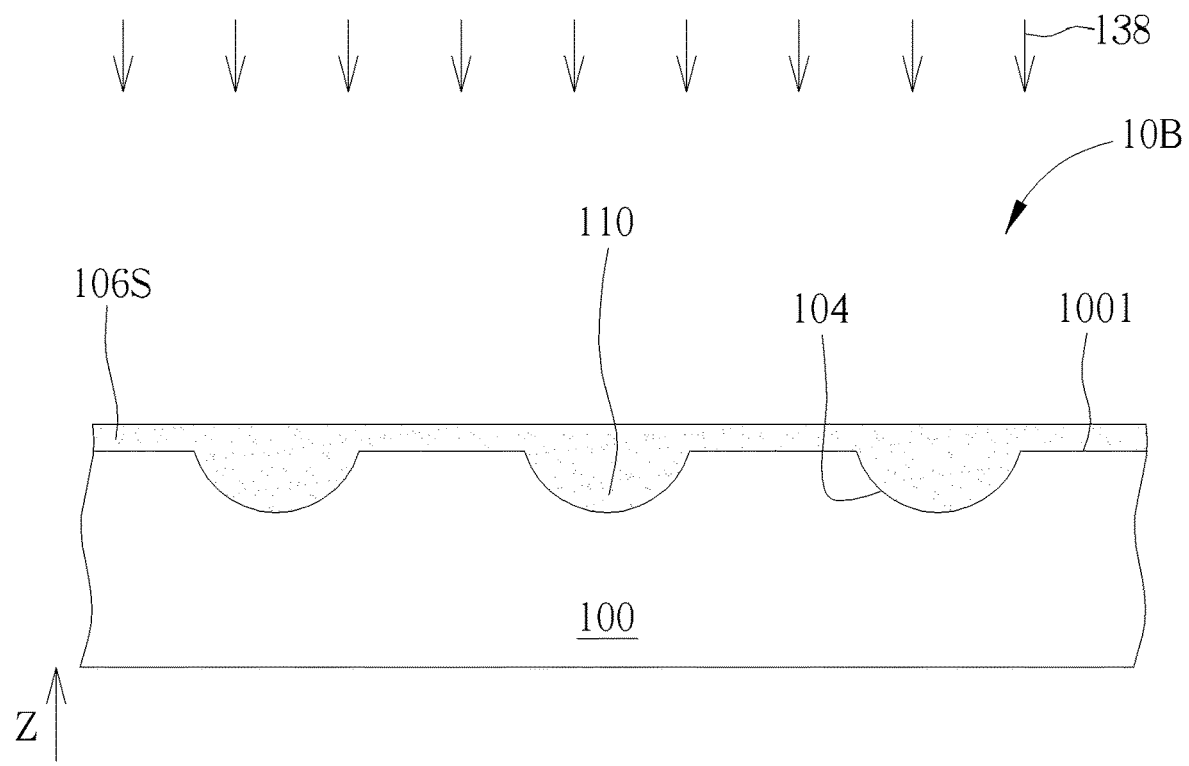

Referring to FIG. 16 to FIG. 17, FIGS. 16-17 are schematic diagrams illustrating a fabrication method of a micro-lens layer of a second embodiment of the present invention. In a fabrication method of a micro-lens layer 10B of this embodiment, the steps from providing the first substrate 100 to forming the first layer 106 are the same as the first embodiment (as shown in FIG. 1 to FIG. 2). As shown in FIG. 16, the difference between the first embodiment and this embodiment is that after one first layer 106 is conformally formed, a plurality of first layers 106 are additionally formed thereon in this embodiment. These first layers 106 together form a stacked layer 106S filling the recesses 104 to form the micro-lenses 110. The material of the first layers 106 can include a high refractive index material, and the refractive index of the high refractive index material ranges from 1.5 to 4.5. For example, the material of the first layer 106 may include amorphous silicon, but not limited thereto. Comparing to the conventional micro-lenses that are usually formed of polymer materials, the material of the micro-lenses 110 of this embodiment is amorphous silicon having better heat resistance and therefore can endure the heat produced during the fabrication method of this embodiment. In addition, the micro-lenses 110 of this embodiment are formed of the high refractive index material, thus the micro-lenses 110 of this embodiment can have a shorter focal length comparing to the first embodiment, the distance between the light sensor 124 and the micro-lens 110 in FIG. 13 can be reduced, and the thickness of the optical sensing device 40 can also be reduced. Additionally, as shown in FIG. 17, a planarization process 138 can be performed to a surface of the stacked layer 106S distant from the substrate 100 (i.e., the upper surface in FIG. 16) after the stacked layer 106S is formed. The flat surface is beneficial for bonding the micro-lenses 110 to other substrates later. Accordingly, the micro-lens layer 10B of the second embodiment is formed.

Figure 18:
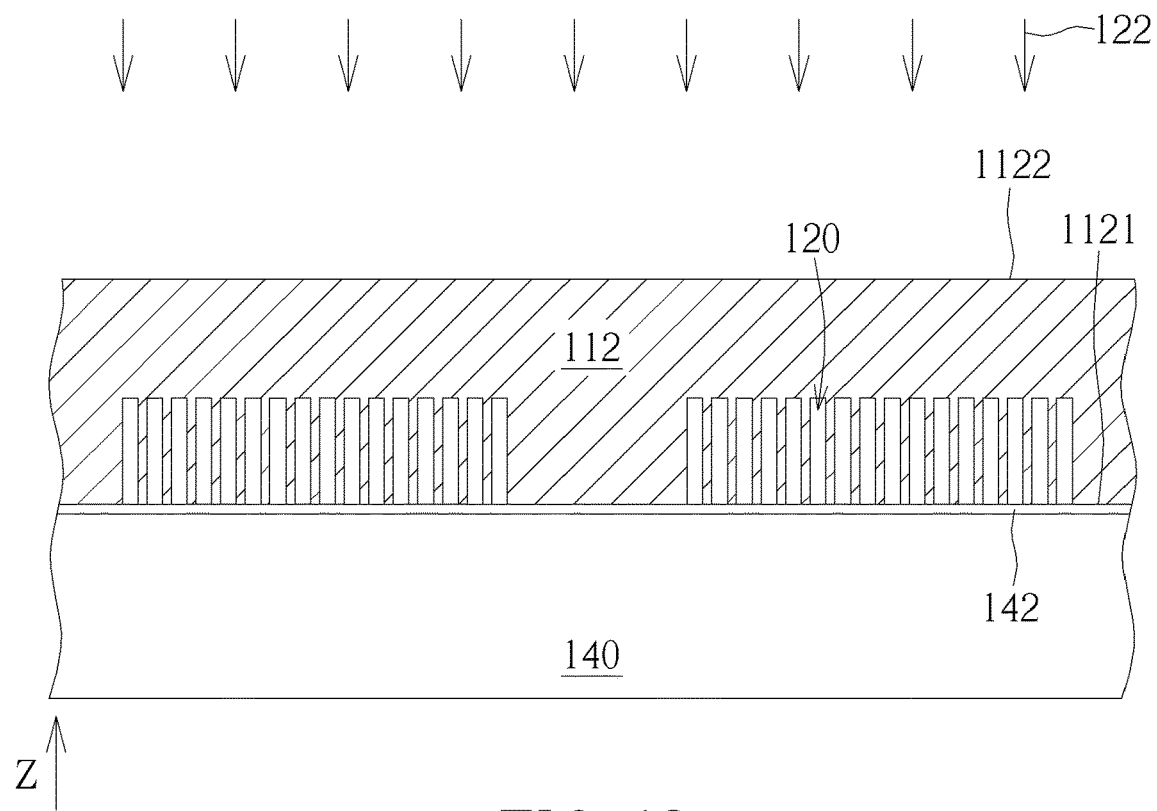
FIGS. 18-20 are schematic diagrams illustrating a fabrication method of a micro optical channel layer of the second embodiment of the present invention.
Figure 19:
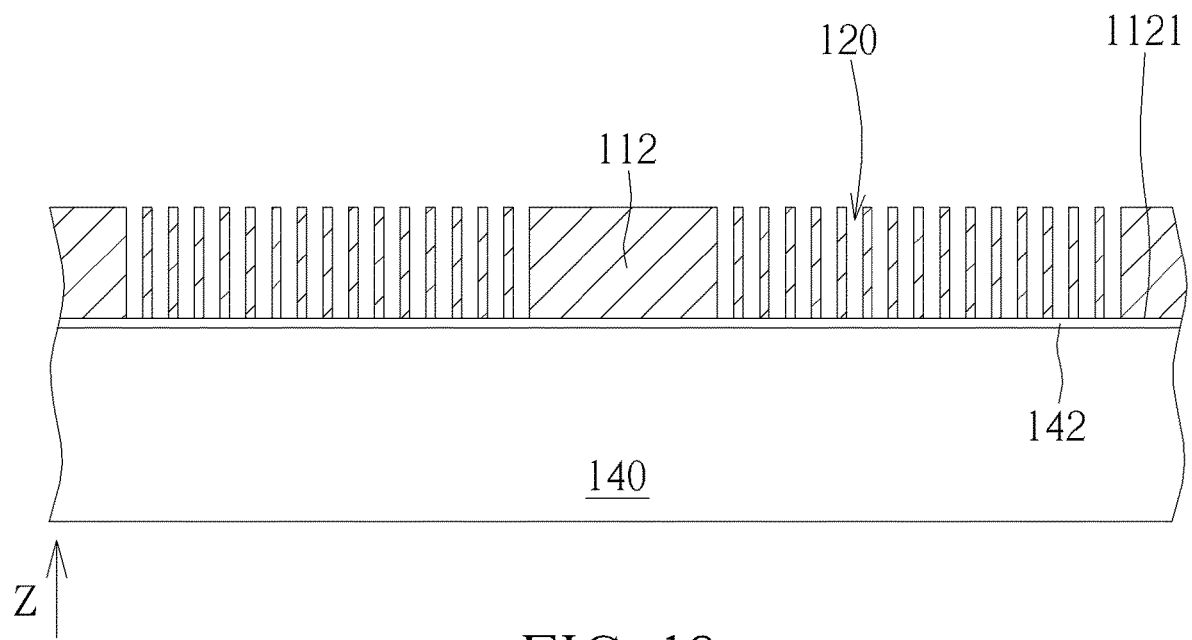
Figure 20:
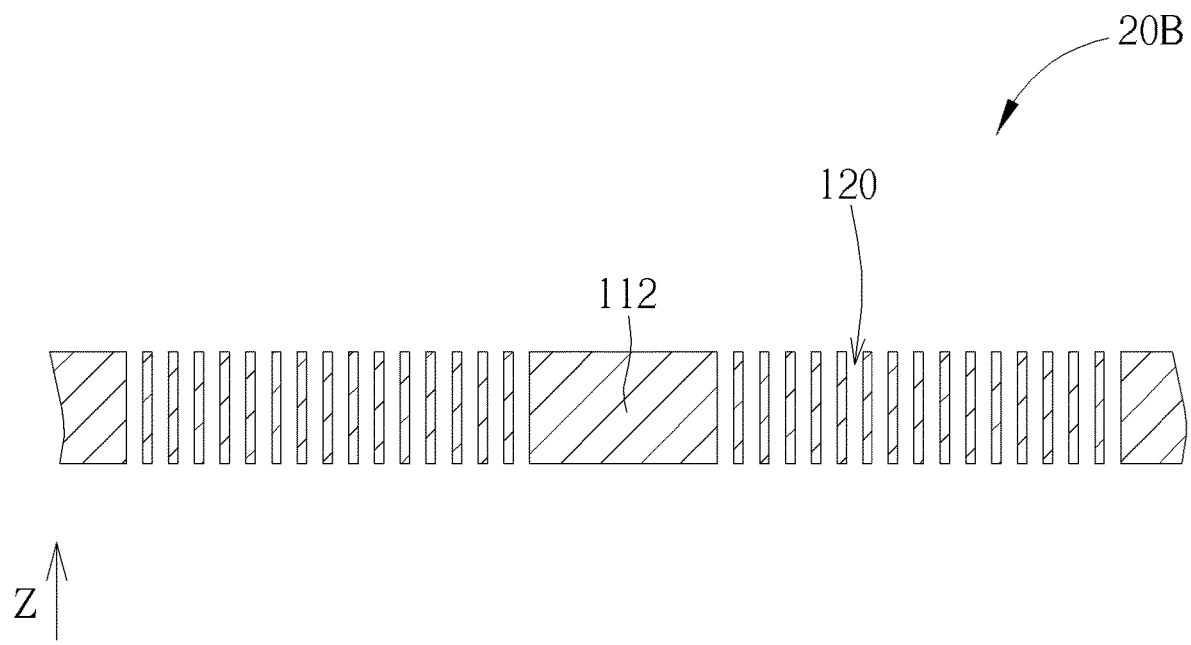

Referring to FIG. 18 to FIG. 20, FIGS. 18-20 are schematic diagrams illustrating a fabrication method of a micro optical channel layer of the second embodiment of the present invention. In a fabrication method of a micro optical channel layer 20B in this embodiment, the steps from providing the second substrate 112 to forming the micro optical channels 120 are the same as the first embodiment (as shown in FIG. 4 to FIG. 6). As shown in FIG. 18, the difference between the first embodiment and this embodiment is that a carrier substrate 140 is provided after the patterned mask layer 116 is removed (i.e., after the deep etching process 118) in this embodiment, and the first surface 1121 of the second substrate 112 is bonded to the carrier substrate 140 by an adhesive layer 142. The carrier substrate 140 of this embodiment may include a rigid substrate, but not limited thereto. Next, a thinning process 122 is performed to the second surface 1122 of the second substrate 112 opposite to the first surface 1121. A portion of the second substrate 112 close to the second surface 1122 is removed to expose the micro optical channels 120 and make the micro optical channels 120 penetrate the second substrate 112, as shown in FIG. 19. The thinning process 122 of this embodiment may include the grinding process, but not limited thereto. Next, as shown in FIG. 20, the carrier substrate 140 is removed and the adhesive layer 142 is removed together to form the micro optical channel layer 20B of this embodiment.

Figure 21:
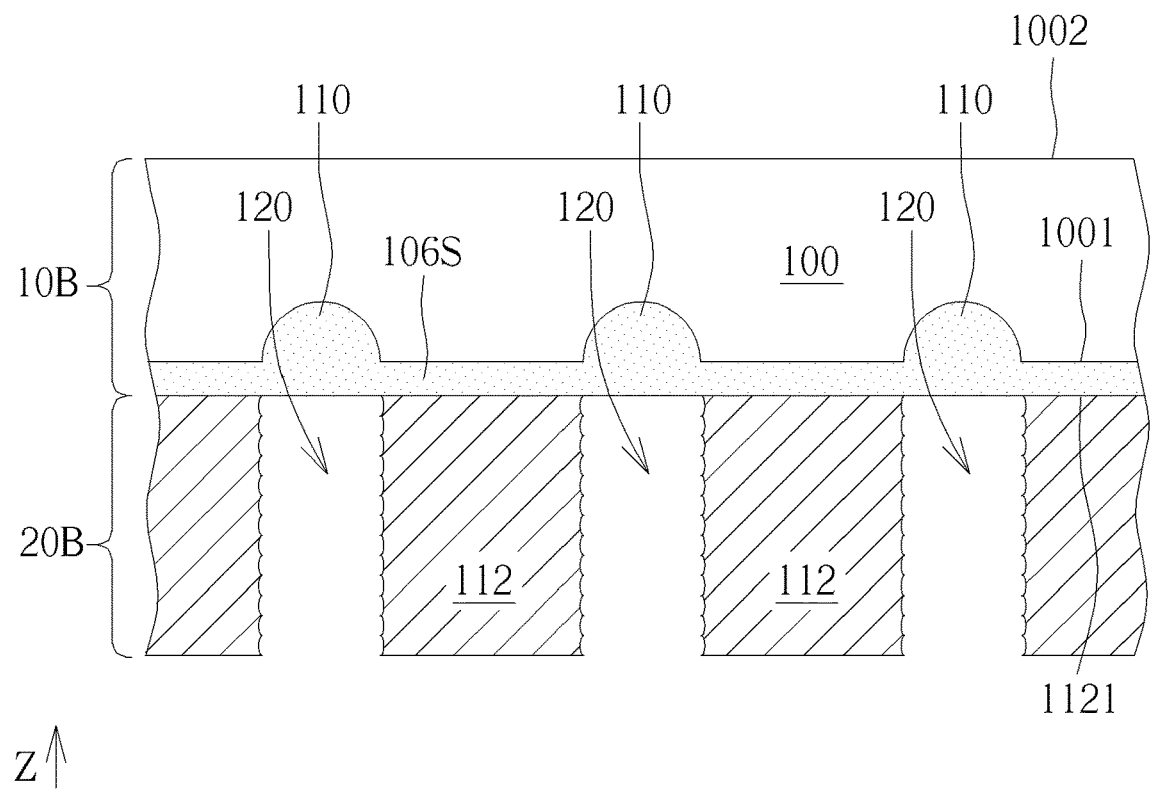
FIGS. 21-22 are schematic diagrams illustrating a first bonding process of the second embodiment of the present invention.
Figure 22:
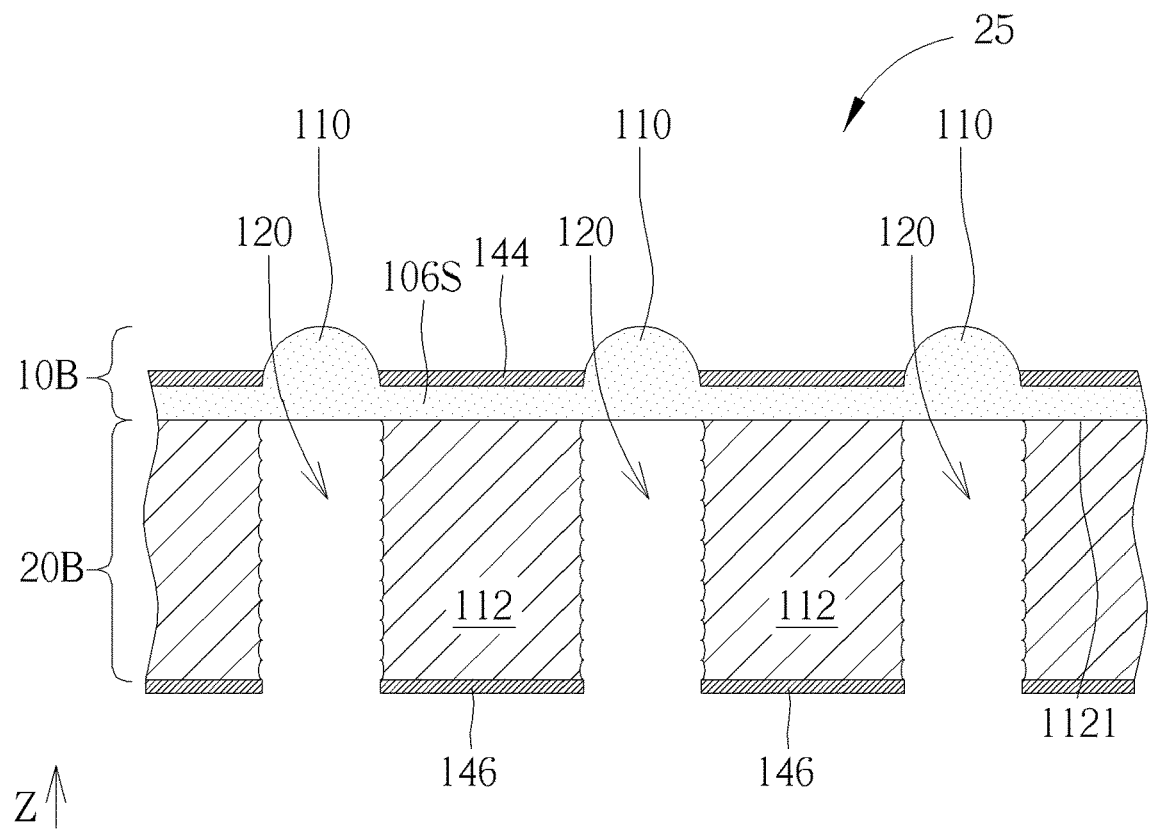

Referring to FIG. 21 to FIG. 22, FIGS. 21-22 are schematic diagrams illustrating a first bonding process of the second embodiment of the present invention. For clarity, only three micro-lenses 110 and three micro optical channels 120 are illustrated in FIG. 21 and FIG. 22 for example, but the numbers of the micro-lenses 110 and the micro optical channels 120 are not limited thereto. As shown in FIG. 21, the first bonding process is performed, the micro-lens layer 10B is bonded to the micro optical channel layer 20B by making the surface 1001 of the first substrate 100 face the first surface 1121 of the second substrate 112, so that each of the micro-lenses 110 corresponds to one of the micro optical channels 120 in the vertical projection direction Z. Next, the first substrate 100 of the micro-lens layer 10B is removed. The etching process is performed to another surface 1002 of the first substrate 100 opposite to the surface 1001 in this embodiment, so as to remove the first substrate 100 (e.g., glass substrate) and expose the micro-lenses 110, as shown in FIG. 22. In other words, the thinning process 122 is performed before removing the first substrate 100 of the micro-lens layer 10B in this embodiment. Next, as described in the first embodiment, the patterned optical coatings 144, 146 can be formed on two sides of the second substrate 112 in the vertical projection direction Z. Accordingly, the optical element 25 of this embodiment can be formed. In addition, the following second bonding process of this embodiment is the same as the first embodiment, and will not be redundantly described.

The fabrication methods of the micro-lens layer and the fabrication methods of the micro optical channel layer described in the different embodiments above can be replaced or mixed with one another. For example, the fabrication method of the micro-lens layer in the first embodiment can be combined with the fabrication method of the micro optical channel layer and the first bonding process in the second embodiment. Additionally, the fabrication method of the micro-lens layer in the second embodiment can be combined with the fabrication method of the micro optical channel layer and the first bonding process in the first embodiment.

To sum up, the wafer level micro-lens array and the wafer level light-path micro-channel array can be fabricated by the semiconductor manufacturing process or the MEMS technology in the present invention, so as to fabricate the micro optical sensing device having the optical fingerprint identification function. The fabrication method in the present invention can achieve the alignment with the precision that cannot be realized by the conventional processes such as molding or machining, and the fabrication method in the present invention is capable of fabricating the optical element having small size. According to the imaging function of the micro-lenses in the present invention, the optical sensing device of the present invention is able to be applied to the front viewing side in the smartphone, and the optical sensing device can perform optic fingerprint identification without forming a hole on the screen glass. In addition, the advantage of fabricating the optical elements and the optical sensing devices by batch can be achieved through the semiconductor manufacturing process or the MEMS technology in the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical element fabrication method, comprising:
   forming a micro-lens layer, wherein the micro-lens layer comprises a micro-lens and a first substrate, and the micro-lens is disposed on a surface of the first substrate;
   forming a micro optical channel layer, wherein the micro optical channel layer comprises a micro optical channel and a second substrate, and the micro optical channel is disposed at a first surface of the second substrate;
   performing a bonding process to bond the micro-lens layer to the micro optical channel layer by making the surface of the first substrate face the first surface of the second substrate, so that the micro-lens corresponds to the micro optical channel in a vertical projection direction perpendicular to the first surface of the second substrate; and
   removing the first substrate of the micro-lens layer.

2. The optical element fabrication method of claim 1, wherein forming the micro-lens layer comprises:
   providing the first substrate;
   forming a recess at the surface of the first substrate;
   forming a first layer conformally on the recess and the surface of the first substrate; and
   forming a second layer on the first layer, wherein the second layer fills the recess to form the micro-lens, and the second layer comprises a low refractive index material.

3. The optical element fabrication method of claim 2, further comprising removing the first layer after removing the first substrate of the micro-lens layer.

4. The optical element fabrication method of claim 1, wherein forming the micro-lens layer comprises:
   providing the first substrate;
   forming a recess at the surface of the first substrate; and
   forming a plurality of first layers on the recess and the surface of the first substrate, wherein the first layers fill the recess to form the micro-lens, and the first layers comprise a high refractive index material.

5. The optical element fabrication method of claim 1, wherein forming the micro optical channel layer comprises:
   providing the second substrate; and
   performing a deep etching process to the first surface of the second substrate to form the micro optical channel.

6. The optical element fabrication method of claim 5, further comprising performing a thinning process to a second surface of the second substrate opposite to the first surface after performing the bonding process, so as to expose the micro optical channel and make the micro optical channel penetrate the second substrate, wherein the thinning process is performed before removing the first substrate of the micro-lens layer or after removing the first substrate of the micro-lens layer.

7. The optical element fabrication method of claim 5, wherein forming the micro optical channel layer further comprises:
   providing a carrier substrate after the deep etching process, and bonding the first surface of the second substrate to the carrier substrate;
   performing a thinning process to a second surface of the second substrate opposite to the first surface, so as to expose the micro optical channel and make the micro optical channel penetrate the second substrate; and removing the carrier substrate.

8. The optical element fabrication method of claim 1, further comprising forming two patterned optical coatings on two sides of the second substrate after removing the first substrate of the micro-lens layer, wherein each of the patterned optical coatings is perpendicular to the vertical projection direction and exposes the micro-lens or the micro optical channel.

9. The optical element fabrication method of claim 1, wherein a side wall of the micro optical channel comprises a ring pattern, and a cross-sectional profile of the ring pattern comprises a scallop shape.

10. The optical element fabrication method of claim 1, wherein an aspect ratio of the micro optical channel ranges from 0.5 to 50.

11. The optical element fabrication method of claim 1, wherein the first substrate comprises a glass substrate, and the second substrate comprises a silicon wafer.

12. The optical element fabrication method of claim 1, wherein the micro-lens layer comprises a plurality of micro-lenses, the micro-lenses are disposed in a matrix on the surface of the first substrate, the micro optical channel layer comprises a plurality of micro optical channels, and the micro optical channels are disposed in a matrix at the first surface of the second substrate.

13. The optical element fabrication method of claim 12, wherein each of the micro optical channels corresponds to one of the micro-lenses in the vertical projection direction after the bonding process is performed.

14. The optical element fabrication method of claim 1, wherein the bonding process comprises adhesive bonding, polymer bonding (BenzoCycloButene, BCB), metal eutectic bonding, silicon on glass (Spin on Glass, SOG) fused bonding, surface activated low-temperature wafer bonding, anodic boding or soldering.

15. An optical sensing device, comprising:
a light sensor, wherein a width of the light sensor ranges from about 10 micrometers to about 100 micrometers;
a micro optical channel layer comprising a micro optical channel and a substrate, wherein the micro optical channel penetrates the substrate in a vertical projection direction perpendicular to a surface of the substrate; and
a micro-lens, wherein the micro optical channel is disposed between the micro-lens and the light sensor, and the micro-lens, the micro optical channel and the light sensor correspond to each other in the vertical projection direction.

16. The optical sensing device of claim 15, wherein a side wall of the micro optical channel comprises a ring pattern, and a cross-sectional profile of the ring pattern comprises a scallop shape.

17. The optical sensing device of claim 15, wherein a cross-sectional profile of the micro optical channel comprises column shape, funnel shape, tapered shape, multi-column shape, column shape with auxiliary collimating structure or column shape with multi-inner diameter.

18. The optical sensing device of claim 15, wherein an aspect ratio of the micro optical channel ranges from 0.5 to 50.

19. The optical sensing device of claim 15, further comprising a plurality of patterned optical coatings disposed on two sides of the micro optical channel layer respectively, wherein the patterned optical coatings expose the micro-lens and the micro optical channel.

20. The optical sensing device of claim 15, comprising a plurality of light sensors and a plurality of micro-lenses, wherein the micro optical channel layer comprises a plurality of micro optical channels, and each of the micro optical channels corresponds to one of the micro-lenses and one of the light sensors in the vertical projection direction.

* * * * *